(12) United States Patent
Kim et al.

(10) Patent No.: US 7,893,942 B2
(45) Date of Patent: Feb. 22, 2011

(54) THREE-DIMENSIONAL GRAPHIC PROCESSING SYSTEM AND METHOD CAPABLE OF UTILIZING CAMERA PREVIEW IMAGES

(75) Inventors: Hag Keun Kim, Gyeonggi-do (KR); Duck Myung Lee, Seoul (KR); Han Jun Choi, Gyeonggi-do (KR)

(73) Assignee: Nexuschips Co., Ltd., Seoul (KR)

( * ) Notice: Subject to any disclaimer, the term of this patent is extended or adjusted under 35 U.S.C. 154(b) by 701 days.

(21) Appl. No.: 11/390,100

(22) Filed: Mar. 28, 2006

(65) Prior Publication Data

US 2006/0214939 A1   Sep. 28, 2006

(30) Foreign Application Priority Data

Mar. 28, 2005 (KR) .................. 10-2005-0025490

(51) Int. Cl.
*G06T 1/00* (2006.01)

(52) U.S. Cl. .................. 345/522; 345/503; 345/520; 345/581; 345/619; 345/632; 345/634; 348/222.1; 348/333.11; 348/333.12

(58) Field of Classification Search .................. 345/638; 348/211.5
See application file for complete search history.

(56) References Cited

U.S. PATENT DOCUMENTS 5,828,406 A * 10/1998 Parulski et al. ........... 348/220.1

7,046,927 B2 * 5/2006 Dalton et al. ............... 396/287

FOREIGN PATENT DOCUMENTS

| KR | 100400208 B1 | 9/2003 |
|----|--------------|--------|
| KR | 1020040106658 A | 12/2004 |
| KR | 1020050005102 A | 1/2005 |

* cited by examiner

*Primary Examiner*—Antonio A Caschera
(74) *Attorney, Agent, or Firm*—Rosenberg, Klein & Lee

(57) ABSTRACT

Provided is a three-dimensional (3D) graphic processing system and method capable of utilizing camera preview images in which the camera preview images are stored in a texture memory and then the stored camera preview images are used as a texture in a 3D graphic processor. The camera preview images are stored in a texture memory and then the stored camera preview images are used as a texture in a 3D graphic processor, in a manner that an extended function can be supported through a mutual operation of a preview processor and a graphic processor. The camera preview is displayed on the moving polygonal plane to which a near-and-far sense is applied, or the camera image is used as a background texture to then enable 3D objects to be drawn on the background texture. As a result, games with real feeling can be developed in a manner that 3D contents can be realized using real images as a background.

7 Claims, 5 Drawing Sheets

THREE-DIMENSIONAL GRAPHIC PROCESSING SYSTEM AND METHOD CAPABLE OF UTILIZING CAMERA PREVIEW IMAGES

BACKGROUND OF THE INVENTION

1. Field of the Invention

The present invention relates to a three-dimensional (3D) graphic processing technology of using camera preview images, and more particularly, to a three-dimensional (3D) graphic processing system and method capable of utilizing camera preview images in which the camera preview images are stored in a texture memory and then the stored camera preview images are used as a texture in a 3D graphic processor.

2. Description of the Related Art

Recently, digital cameras are very popular as much as a newly coined word called a "DICA tribe" has appeared in order to call people which enjoy the digital cameras. Particularly, according to development of image sensors with high sensitivity and ultra-small digital camera modules, ultra-small digital cameras can be mounted on mobile communications terminals or personal digital assistants (PDAs). Furthermore, according to appearance of high-performance ultra-small digital camera modules which are not behind general digital cameras, the digital cameras put down roots as essential items of mobile communications terminals together with color liquid crystal displays (LCDs).

The mobile communications terminals mounting the ultra-small digital cameras (called camera phones) conveniently take a picture of an object. Then, the camera phones use the taken picture as a background picture, or immediately transmit the taken picture to a desired person. Accordingly, the camera phones are very popular. In particular, since the new generation thinking especially the mobile communications terminals as tools of self-expression can express their own personalities, the camera phones become further popular.

In the meantime, digital cameras or digital camcorders as well as the above-described camera phones are provided with a preview function of allowing a photographer to confirm or preview a picture to be photographed through a liquid crystal display (LCD) in advance, respectively.

In order to perform a preview operation, an image sensor scans an image in a Video Graphics Array (VGA) form (that is, 640×480, 320×240). Then, the scanned image is converted into a digital signal. Then, the digital signal is converted into a color signal of a predetermined mode such as YUV or YCbCr and delivered to a main processor in a serial or parallel mode. Thereafter, the main processor converts video data of the YUV or YCbCr color into the color of the other predetermined mode such as RGB (Red, Green, Blue) code and stores the converted result in a storage device. The main processor resizes the converted result according to the resolution (that is, the size) of a liquid display device (LCD) and outputs the resized result as a preview.

The conventional preview mode has the problem that the size of video data which the image sensor scans is greater than the resolution (the size) of the general display device such as a liquid crystal display (LCD), to thus let the video data to previewed after passing through conversion of the resolution (the size) (that is, resizing), and to thereby cause the load of the main processor to be enlarged and the preview speed to be lowered.

Particularly, when a large capacity of image data is processed because the main processor performs various tasks in the camera phone, a processing speed falls down very much. The space of a storage device for storing video data of which the capacity is large is wasted.

In Korea Patent Laid-open Publication No. 2004-106658 was proposed an image data high speed preview method in consideration of the above-described problem. Here, a processor delivers the resolution of a display device such as a LCD to an image sensor, so that the image sensor scans an image according to the resolution of the display device, and then delivers the scanned image to the processor so that the processor outputs on the display device without any conversion of the resolution to thus enable a user to enjoy a high speed preview of image data.

Moreover, in Korea Patent Laid-open Publication No. 2005-5102 was disclosed a video data preview automatic control method. Here, when video data is previewed in digital cameras, and digital camcorders or mobile communications terminals having a digital photographing function, a preview is automatically stopped to reduce unnecessary power consumption if it is determined that a preview state was left alone over a predetermined time.

However, the conventional art displays the images obtained through the image sensor on the display device as they are, but does not present a measure which utilizes the images in various forms in a graphic processor.

Figure 1:
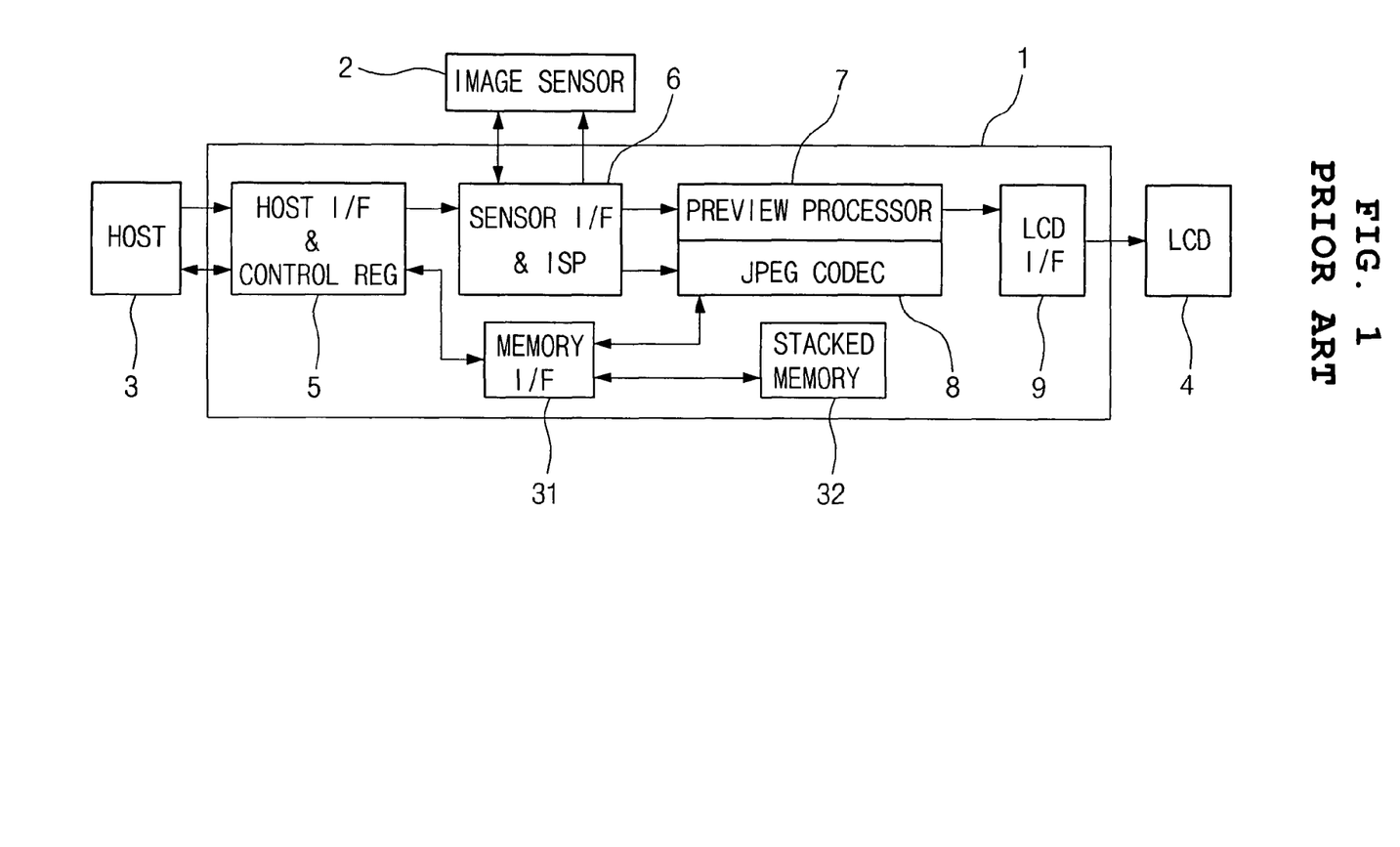
FIG. 1 is a schematic block diagram showing a conventional camera chip having no graphic processor.

In the meantime, FIG. 1 shows the whole structure of a conventional camera chip having no graphic processor. The conventional camera chip 1 includes a host interface/control register (Host I/F & Control REG) 5, a sensor interface/ISP (Image Signal Processor) 6, a preview processor 7, a JPEG (Joint Photographic coding Experts Group) CODEC (COmpress/DECompress) 8, a stacked memory 32 and a LCD interface 9.

The host interface/control register (Host I/F & Control REG) 5, is provided to perform an interface with a host 3 and to store a control signal of the host with respect to the camera chip.

The sensor interface/ISP (Image Signal Processor) 6 receives an input image input from a charge coupled device (CCD) or a CMOS type image sensor 2 for example, to the camera chip 1 and is connected to the host 3 through the host interface/control register 5.

The preview processor 7 performs a preview operation of sending the image received through the sensor I/F & ISP 6 from the sensor 2 immediately to a liquid crystal display (LCD) 4.

The JPEG CODEC 8 compresses the image received from the image sensor by JPEG and decodes JPEG image received from the host 3 to then be sent to the LCD 4.

The stacked memory 32 stores the JPEG compressed image received from the image sensor 2 through a memory interface 31 and JPEG image received from the host 3.

The LCD interface 9 performs an interface between the preview processor 7 and the LCD 4.

When this conventional camera chip provides a preview function of allowing a user to preview and confirm a picture of an object to be photographed through the LCD 4 in advance, conversion of the resolution (the size), that is, resizing is performed, to fit for the display size of the LCD 4 in the preview processor 7, and an input image received from the image sensor 2 is sent immediately to the LCD 4 to then be simply displayed. However, a further expanded function is not supported.

Figure 2:
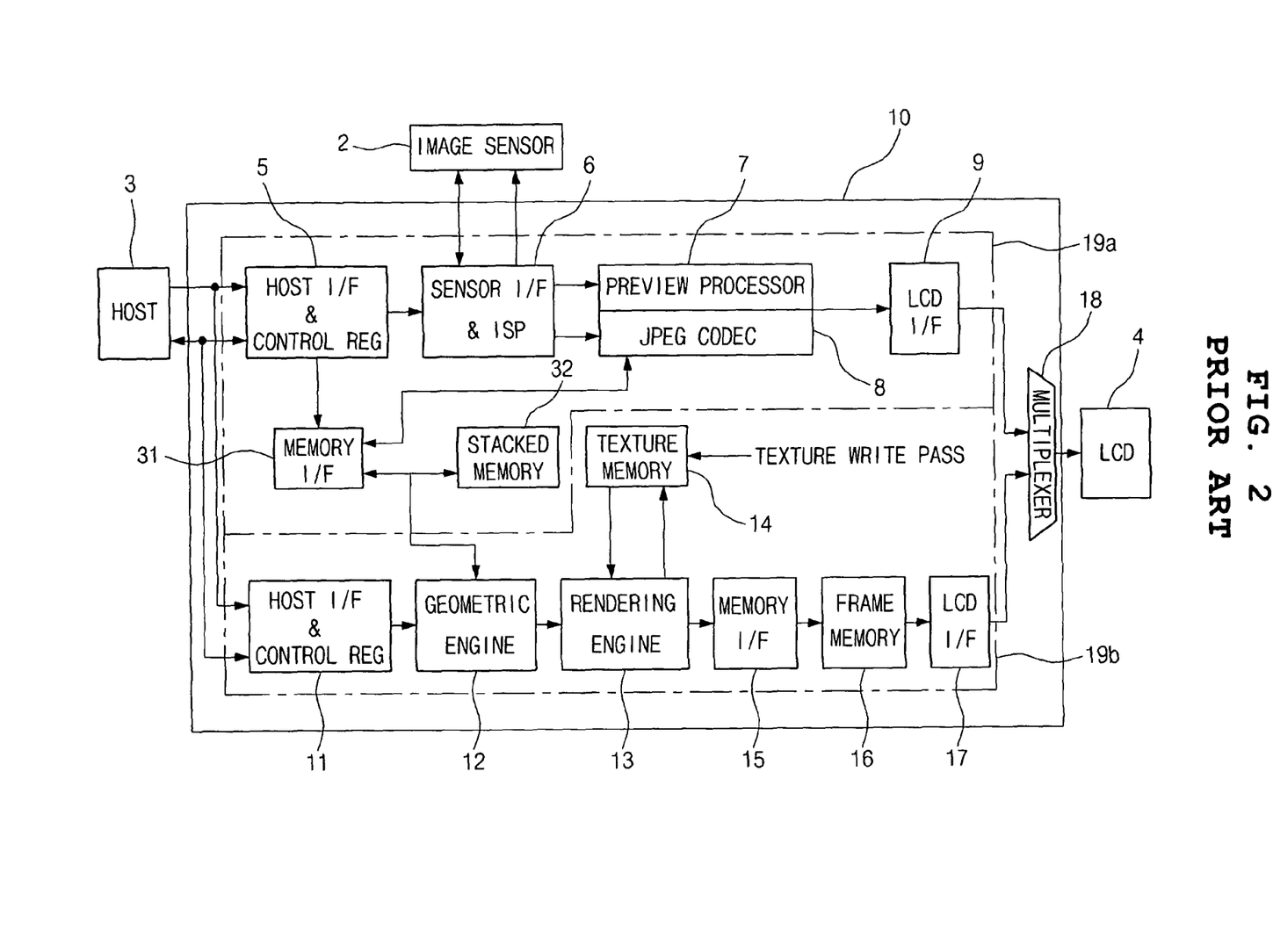
FIG. 2 is a schematic block diagram showing a conventional camera chip having a graphic processor.

FIG. 2 is a schematic block diagram showing a merged chip including a conventional camera processor and a graphic processor. The merged chip 10 includes a graphic processor 19b for acceleration of 3D graphics in addition to a camera processor 19a which is the same as the camera chip of FIG. 1.

The camera processor 19a and the graphic processor 19b perform respectively different operations and output the processed results through a multiplexer 18 to a LCD 4.

The graphic processor 19b includes a host interface (Host I/F) & control register 11, a geometric engine (GE) 12, a rendering engine (RE) 13, a texture memory 14, a memory interface 15, a frame memory 16 and a LCD interface 17, in order to perform the processing for 3D graphics acceleration.

The geometric engine 12 chiefly performs position transformation and lighting calculation of a polygon necessary for 3D graphic processing so that a point (vertex) on a basis coordinate system is converted into a coordinate positioned through an actual eye.

The rendering engine 13 actually draws pictures in units of a pixel based on the coordinate generated from the geometric engine 12.

The texture memory 14 memorizes texture data.

In the configuration of FIG. 2, the host interface & control registers 5 and 11 and the LCD interfaces 9 and 17 can be simplified into a single block, respectively, so that the conventional camera chip 19a and the graphic processor 19b share the simplified blocks. Otherwise, as described above, the host interface & control registers 5 and 11 and the LCD interfaces 9 and 17 can be separately designed.

However, even in the case of the merged chip having the camera processor 19a and the graphic processor 19b, the other functions are not supported except that the preview image of the camera is directly displayed on the LCD 4 and thus the camera input image is only displayed on the LCD 4 of the rectangular shape. Moreover, in the case of the conventional graphic process of writing texture data in the texture memory 14 through only a texture write pass, only the graphic using the texture which is considered during the manufacture in the contents can be supported.

Figure 3:
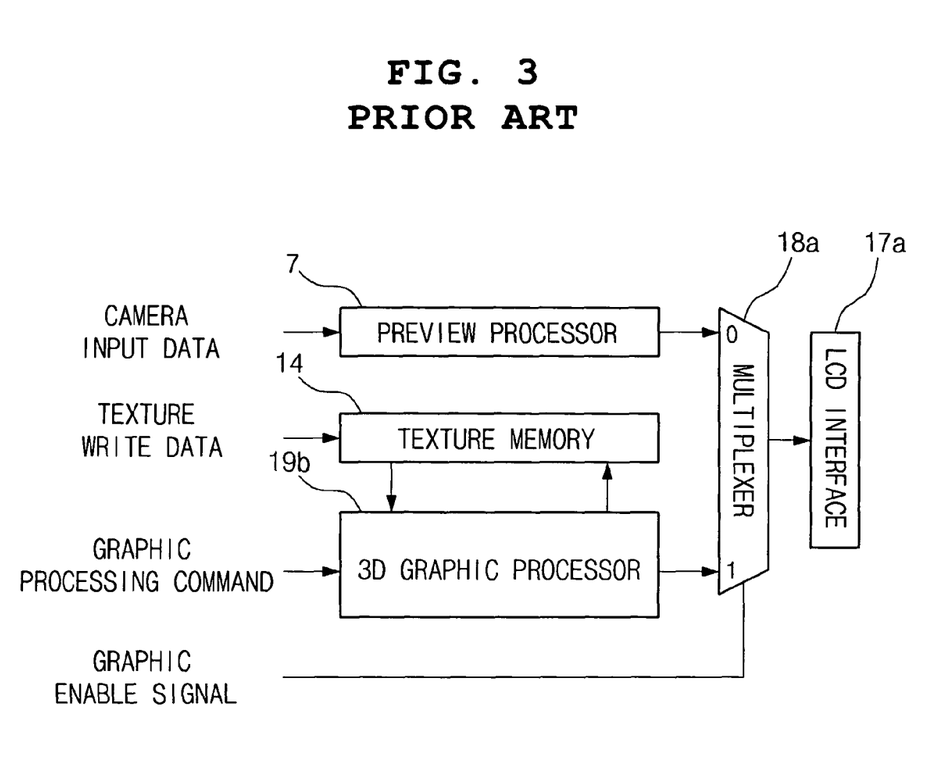
FIG. 3 is a block diagram showing a modified structure of FIG. 2 that uses a single liquid crystal display (LCD) interface (I/F)

FIG. 3 is a block diagram showing a modified structure of FIG. 2 that uses a single LCD interface I/F. In FIG. 3, the output of a preview processor 7 and the output of a graphic processor 19b are selected in a multiplexer 18a and the selected result is output to a LCD 4 through a LCD interface 17a. Here, since the FIG. 3 structure is the same as the FIG. 2 structure, except for the above-described difference of the position of the LCD 4 between FIGS. 2 and 3, the same reference numerals are assigned to the same elements in FIGS. 2 and 3. That is, according to a graphic enable signal from a host, the multiplexer 18a outputs a graphic signal, or a preview image of the camera to the LCD interface 17a. Therefore, the modified signal processing circuit of FIG. 3 performs the same operations as those of FIG. 2, the detailed description thereof will be omitted.

As described above, the camera processor and the graphic processor are not connected each other but separately operate. A support of an extended camera function is essential at a situation where only the camera function is no more competitive power. Accordingly, a graphic processing system of a new concept capable of using a realistic camera input image as a texture at the side of the graphic function is required.

SUMMARY OF THE INVENTION

To solve the above problems, it is an object of the present invention to provide a three-dimensional (3D) graphic processing system and method capable of utilizing camera preview images in which the camera preview images are stored in a texture memory and then the stored camera preview images are used as a texture in a 3D graphic processor, in a manner that an extended function can be supported through a mutual operation of a preview processor and a graphic processor.

It is another object of the present invention to provide a 3D graphic processing system which can support a function of which the camera preview display is more extended in various kinds of portable terminals equipped with a camera module and a 3D graphic processor, and can support various kinds of contents with real feeling with a result of the graphic process.

It is still another object of the present invention to provide a 3D graphic processing system which can easily obtain a 3D graphic content having a real image input through a digital camera as a background and a method for making up of the 3D graphic content.

To accomplish the above object of the present invention, there is provided a three-dimensional (3D) graphic processing system comprising: a preview processor which scales received input data according to a display device size and generates a camera preview image in the case that input data received from a digital camera is valid; an address generator which generates an address and control signals necessary for a memory writing operation of the preview image in response to a data valid signal representing whether or not the camera input data is valid; first through third multiplexers which select and output one of texture data, an address and control signals from a host, and the camera preview image data from the preview processor and the address and the control signals from the address generator which correspond to the texture data, the address and the control signals from the host, respectively, according to a texture source selection signal from the host; a texture memory of storing the texture data from the host or the camera preview image data in a designated address according to an output selection of the first through third multiplexers; and a 3D graphic processor which uses the texture data or camera preview image data stored in the texture memory as a texture according to a graphic process command from the host in order to perform a 3D graphic processing.

Moreover, the present invention system further comprises an output selector which selects an output obtained by 3D graphically processing camera preview image data stored in the texture memory, by the graphic processor, in the case that the graphic enable signal from the host is at an active state, and selects camera preview image data of the preview processor in the case that the graphic enable signal is at an inactive state, and outputs the selected result to a display device.

The 3D graphic processor can realize preview images which move by 3D graphically processing camera preview image data by using the camera preview image data as a texture. In this case, the preview image is accomplished by displaying camera preview image data on a moving polygonal plane to which a far-and-near sense is applied.

Moreover, the graphic processor can make up a 3D graphic content by using the camera preview image registered in the texture memory as a background. In this case, the 3D graphic content is obtained by drawing two large triangles corresponding to the background by use of the camera preview image as a texture, and drawing a 3D object thereon.

The address generator produces an address so that data is written from the lower portion of the texture memory to the upper portion thereof, or from the upper portion to the lower portion.

According to another aspect of the present invention, there is provided a three-dimensional (3D) graphic processing method comprising the steps of: generating a camera preview image by processing received input data with a preview function in the case that received input data of the digital camera is valid; storing texture data or camera preview image data from a host in a texture memory according to a texture source selection signal from the host; and executing a 3D graphic process by using texture data or camera preview image data stored in the texture memory as a texture according to a graphic processing command from the host.

In this case, the 3D graphic processing step of using camera preview image data as a texture comprises the sub-steps of: generating a signal which newly draws a camera preview image of a still picture 3D graphically in every frame in order to realize a moving plane; and displaying the camera preview image on the moving polygonal plane to which a far-and-near sense is applied.

Moreover, the 3D graphic processing step of using the camera preview image data as a texture comprises the sub-steps of drawing two large triangles corresponding to the background by use of the camera preview image as a texture; and drawing a 3D object on the camera preview image drawn over the background, to thereby make up 3D graphic contents which use the camera preview image as the background.

Moreover, it is preferable that 3D graphic processing method further comprises the steps of generating an address and control signals necessary for storing camera preview image data in the texture memory in response to a data valid signal which shows whether or not the camera input data is valid; and generating a preview image storage completion signal representing that a corresponding preview image is completely written in the texture memory based on the generated address.

According to still another aspect of the present invention, there is provided a 3D graphic processing method comprising the steps of preview processing video data photographed through an image sensor; storing the obtained preview image in a texture memory; and executing a 3D graphic process using the stored preview image as a texture.

According to yet another aspect of the present invention, there is also provided a 3D graphic processing method comprising the steps of photographing an image of an object through an image sensor; signal-processing the received image data of the object and storing the signal processed result in a first memory, and generating a preview image; processing to resize the received input image data in the case that the input image stored in the first memory is valid data; storing the generated preview image data in the second memory; and executing a 3D graphic process by using the preview image data stored in the second memory as a texture, by a 3D graphic processor.

According to the present invention, a method of making up a 3D graphic content using a real background image comprises the steps of: taking a picture of an actual background image through the image sensor; preview processing video data of the photographed background image; storing the obtained preview image in the texture memory; drawing two large triangles corresponding to a background by using the preview image as a texture; and drawing a 3D object over the actual background image.

As described above, the graphic processing system according to the present invention can be used for development of games by using a camera preview image stored in a texture memory as a texture in a graphic process through a coupling between a preview processor and a graphic processor in a cellular phone, a PDA, etc., in which the camera preview is displayed to a moving polygonal plane of which a far-and-near sense is applied or the camera input image is used as the background texture, and drawing a 3D object over the background texture, to thereby realize a real image as a background.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE INVENTION

A three-dimensional (3D) graphic processing system and method capable of utilizing camera preview images in which the camera preview images are stored in a texture memory and then the stored camera preview images are used as a texture in a 3D graphic processor according to a preferred embodiment of the present invention will be described below with reference to the accompanying drawings.

Figure 4:
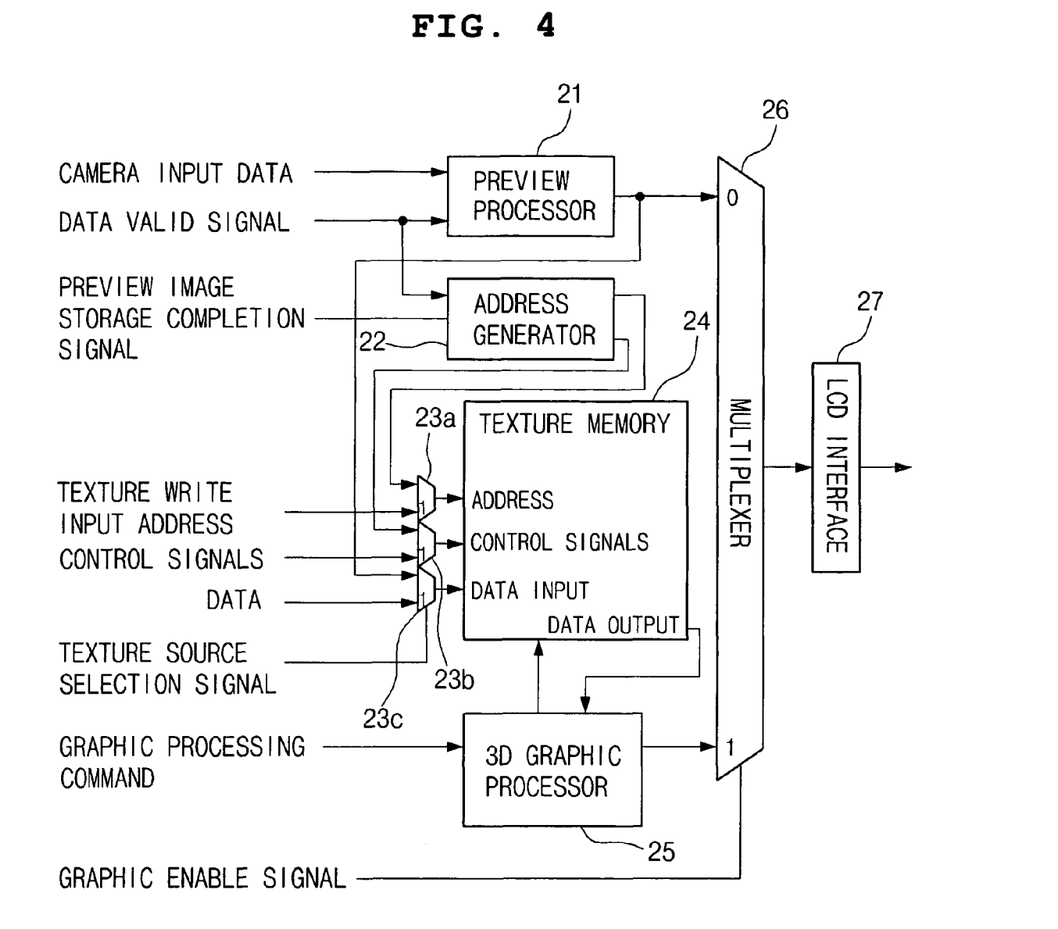
FIG. 4 is a block diagram showing a three-dimensional (3D) graphic processing system capable of utilizing camera preview images according to the present invention.

FIG. 4 shows a three-dimensional (3D) graphic processing system capable of utilizing camera preview images according to the present invention. Referring to FIG. 4, the 3D graphic processing system includes a preview processor 21, an address generator 22, first through third multiplexers 23a-23c, a texture memory 24, a 3D graphic processor 25, and a multiplexer 26.

The preview processor 21 receives an input image photographed via a CCD (Charged Coupled Device) or CMOS type image sensor, that is, a camera input data and a data valid signal representing whether or not the received camera input data is a data valid signal, and generates a camera preview image by preview-processing the received input data in the case that the received camera input data is valid.

The address generator 22 generates an address and control signals (cs_b and wr_b) necessary for a memory writing operation of the camera preview image in response to the data valid signal representing whether or not the camera input data is valid, and generates a preview image storage completion signal after the complete memory writing operation for the preview image.

The first multiplexer 23a selects and outputs one of an address included in a texture writing input signal from a host and the address from the address generator 22 corresponding to the address from the host, according to a texture source selection signal from the host.

The second multiplexer 23b selects and outputs one of control signals included in the texture writing input signal from the host and the control signals from the address generator 22 corresponding to the control signals from the host, according to the texture source selection signal from the host.

The third multiplexer 23c selects and outputs one of texture data included in the texture writing input signal from the host and the camera preview image data from the preview processor 21 corresponding to the texture data from the host, according to the texture source selection signal from the host.

The texture memory 24 stores the texture data from the host or the camera preview image data in a designated address according to an output selection of the first through third multiplexers.

The 3D graphic processor 25 uses the texture data or camera preview image data stored in the texture memory as a texture according to the graphic process command from the host in order to perform a 3D graphic processing.

The multiplexer 26 selects one of outputs of the preview processor 21 and the graphic processor 25, according to a graphic enable signal from the host, and outputs the selected one to a LCD (Liquid Crystal Display) via a LCD interface 27.

The control signals generated from the address generator 22 are a chip select signal cs_b, and a write signal wr_b, and the address generated from the address generator 22 supports both cases that data is written from the lower portion of the texture memory 24 to the upper portion thereof or from the upper portion to the lower portion thereof. The address generator 22 generates a preview image storage completion signal representing that the preview image has been completely written in the texture memory 24 based on the generated address so that the host can determine whether or not the following preview image has been stored in the texture memory 24.

Moreover, the 3D graphic processor 25 preferably includes a geometric engine (GE) and a rendering engine (RE), in order to perform a 3D graphic acceleration process as shown in FIG. 2. The geometric engine chiefly performs position transformation and lighting calculation of a polygon necessary for 3D graphic processing so that a point (vertex) on a basis coordinate system is converted into a coordinate positioned through an actual eye. The rendering engine actually draws pictures in units of a pixel based on the coordinate generated from the geometric engine.

The three-dimensional (3D) graphic processing system according to the present invention includes a camera processor having the preview processor 21, and a graphic processor 25.

The camera processor further includes a host interface/control register (Host I/F & Control REG), a sensor interface/ISP (Image Signal Processor), a JPEG CODEC and a stacked memory in addition to the preview processor 21, which is similar to the camera processor of FIG. 2.

The graphic processor 25 further includes a host interface (Host I/F) & control register, a memory interface and a frame memory in addition to the geometric engine (GE) and a rendering engine (RE), which is similar to the graphic processor of FIG. 2, but may have another structure corresponding to the above structure.

In the 3D graphic processing system of the present invention constructed as described above, when a user takes a picture of a subject to be photographed with an image sensor, that is, a digital camera module such as a camera phone for example, an image of the subject which enters through the lens of the camera module is picked up by the image sensor of the digital camera module. The camera input data is stored in a storage device such as a stacked memory through a digital signal conversion including signal transformation into the color of the other predetermined modes such as RGB and JPEG signal compression.

Thereafter, the preview processor 21 determines whether or not the received input data of the camera is valid according to a data valid signal and preview-processes the received input data, in the case that the camera input data is valid, to then output the preview image. Here, the preview processor 21 generally preview-processes camera input data by resizing the camera input data according to the LCD panel size, that is, performing a scaling process and all kinds of image effect processes.

In this case, the camera input data is sent to the multiplexer 26, in the case that the graphic enable signal from the host is at an inactive state, and a preview display is made on the LCD through the LCD interface 27. In the case that the graphic enable signal from the host is at an active state, the camera input data is registered by the texture memory 24 and can be variously used in the graphic processor 25. In this case, it is of course possible to register, that is, stores the camera input data in the texture memory 24 by selecting the camera input data as a texture according to a texture source selection signal from the host, instead of the graphic enable signal, and to use the stored signal in a different use.

That is, in the case that the received camera input data is valid, the address generator 22 produces the address and the control signals cs_b, and wr_b which are used for writing the camera input data in the texture memory 24 in response to the data valid signal.

Thereafter, the address and the control signals cs_b and wr_b generated from the address generator 22 and the camera input data from the preview processor 21 are stored in the texture memory 24, according to the texture source selection signal from the host, via the third multiplexers 23a-23c to thus complete a registration procedure. That is, a procedure of storing one image in the texture memory 24 is completed so that the one image can be used as a texture. In this case, the address generator 22 generates the preview image storage completion signal to thereby enable the host to determine the storage of the following preview image in the texture memory 24.

In this case, the texture memory 24 can store 3D graphic contents in advance in an address designated through the first to third multiplexers 23a-23c according to the texture source selection signal from the host.

Therefore, the present invention does not only register (write) an object image input via only an existing texture writing pass from a host, but also register various kinds of actually photographed object images which are input signals of a camera as a texture. As a result, the graphic processor 25 can use the various kinds of actually photographed object images as a texture.

The graphic processor 25 processes 3D graphically the preview image of the still picture which is stored in the texture memory 24 according to a 3D graphic process command from the host in the texture memory 24 at the state where the camera input data, that is, the preview image is stored in the texture memory 24, and generates a newly drawn signal at every frame according to a preset 3D graphic process mode. In this case, a moving flat panel display of the preview image can be realized on the LCD through the multiplexer 26 and the LCD interface 27.

Figure 5:
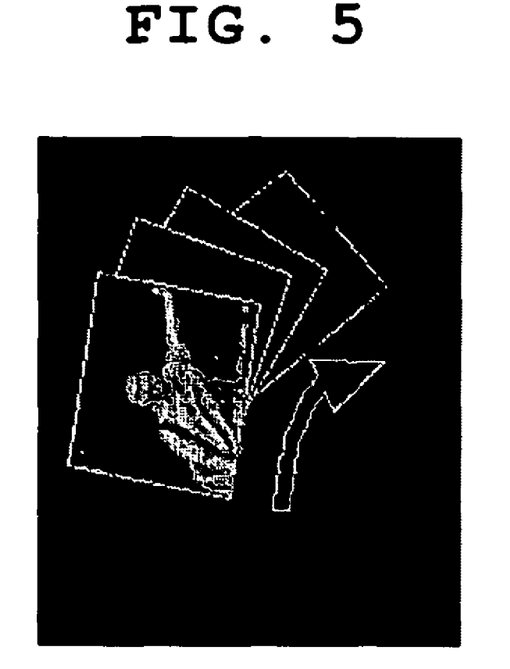
FIG. 5 shows an example of a result that camera preview images are 3D graphically processed according to the present invention.

That is, FIG. 5 shows an example of a result that camera preview images are 3D graphically processed according to the present invention. The graphic processor 25 processes 3D graphically the preview image which is stored in the texture memory 24 at the state where the camera preview image is stored in the texture memory 24, according to a preset 3D graphic process mode, in order to realize a moving plane. For this purpose, the graphic processor 25 activates the texture use and newly draws, that is, provides a coordinate value representing a 3D plane at every frame, in order to realize the moving plane.

In this way, if a coordinate value is newly drawn at every frame in order to represent a 3D plane while using the preview image as a texture, the camera preview image can be implemented on a moving plane which is not fixed into a rectangular frame form.

Therefore, in view of the function of the camera, the present invention can display a preview image in various kinds of polygonal shapes to which a far-and-near sense is applied, although the conventional art supports only a preview of a rectangular shape. That is, the present invention can display a preview image on a 3D plane.

Figure 6:
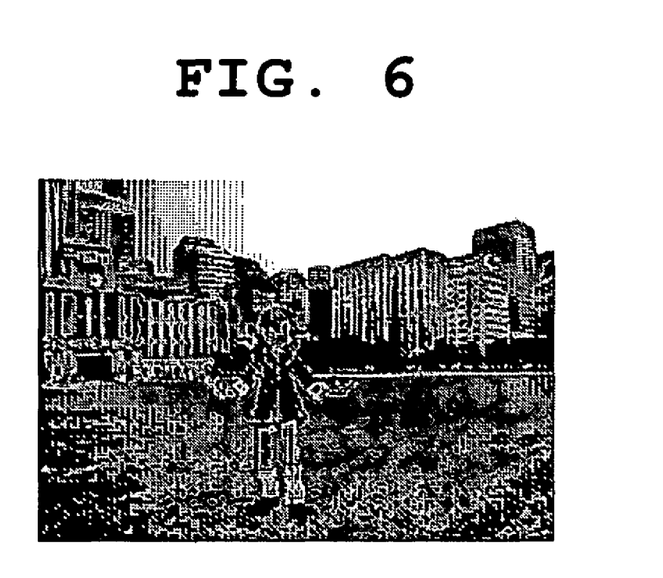
FIG. 6 shows an example of 3D graphic contents that camera preview images are 3D graphically processed as a background according to the present invention.

FIG. 6 shows an example of 3D graphic contents that camera preview images are 3D graphically processed as a background according to the present invention. In FIG. 6, the 3D graphic processor 25 draws two large triangles corresponding to a background, using the camera preview image which is stored in the texture memory 24 as a texture and draws a 3D object on the two large triangles. Accordingly, 3D graphic contents can be obtained in which the preview image of the camera, that is, the real image is used as the background.

Therefore, in view of the graphic, the present invention can support the contents in various forms and with reality by using the actual camera input as a texture, although the conventional art uses only a fixed texture which was made at the time of fabrication of the contents. Accordingly, the present invention can accomplish diversification of the graphic contents.

For example, games realizing 3D graphic contents which use the real images as a background can be developed by using camera input images as background textures, and thus drawing 3D objects over the backgrounds. The present invention can support contents with reality.

As described above, the graphic processing system according to the present invention includes a built-in digital camera module. Accordingly, when the graphic processing system according to the present invention is applied in various kinds of portable terminals capable of performing a 3D graphic process, a camera input image is stored as a texture in the texture memory through mutual coupling of the preview processor and the graphic processor to then be used in the 3D graphic processing as a texture.

Consequently, the camera preview is displayed on the moving polygonal plane to which a near-and-far sense is applied, or the camera image is used as a background texture to then enable 3D objects to be drawn on the background texture. As a result, games with real feeling can be developed in a manner that 3D contents can be realized using real images as a background.

As described above, the present invention has been described with respect to a particularly preferred embodiment. However, the present invention is not limited to the above embodiment, and it is possible for one who has an ordinary skill in the art to make various modifications and variations, without departing off the spirit of the present invention.

What is claimed is:

1. A three-dimensional (3D) graphic processing system comprising:
    a preview processor which scales input data received from a digital camera according to a display device size and generates a camera preview image;
    an address generator which generates a first address and first control signals necessary for a memory writing operation of the camera preview image;
    a plurality of multiplexers coupled to the preview processor and address generator, each actuated according to a texture source selection signal from a host; a first of the multiplexers being actuated to select between the first address and a second address from the host; a second of the multiplexers being actuated to select between the first control signals and second control signals from the host; and, a third of the multiplexers being actuated to select between camera preview image data and texture data from the host;
    a texture memory of storing the texture data from the host or the camera preview image data in a designated address according to an output selection of the first through third multiplexers; and
    a 3D graphic processor which uses the texture data or camera preview image data stored in the texture memory as a texture according to a graphic process command from the host in order to perform 3D graphic processing.

2. The 3D graphic processing system according to claim 1, further comprising an output selector which selects an output obtained by 3D graphically processing camera preview image data stored in the texture memory, by the graphic processor, in the case that the graphic enable signal from the host is at an active state, and selects camera preview image data of the preview processor in the case that the graphic enable signal is at an inactive state, and outputs the selected result to a display device.

3. The 3D graphic processing system according to claim 1, wherein the 3D graphic processor realizes preview images which move by 3D graphically processing camera preview image data by using the camera preview image data as a texture.

4. The 3D graphic processing system according to claim 3, wherein the preview image is accomplished by displaying camera preview image data on a moving polygonal plane to which a far-and-near sense is applied.

5. The 3D graphic processing system according to claim 1, wherein the graphic processor makes up a 3D graphic content by using the camera preview image registered in the texture memory as a background.

6. The 3D graphic processing system according to claim 5, wherein the 3D graphic content is obtained by use of the camera preview image as a texture, and drawing a 3D object thereon.

7. The 3D graphic processing system according to claim 1, wherein the address generator produces the first address so that data is written from a lower portion of the texture memory to an upper portion thereof, or from the upper portion to the lower portion.

* * * * *